June 28, 1960     E. W. MOON 3RD., ET AL     2,942,517
ADJUSTABLE SCREENS FOR PICTURE PROJECTION
Filed Aug. 17, 1956
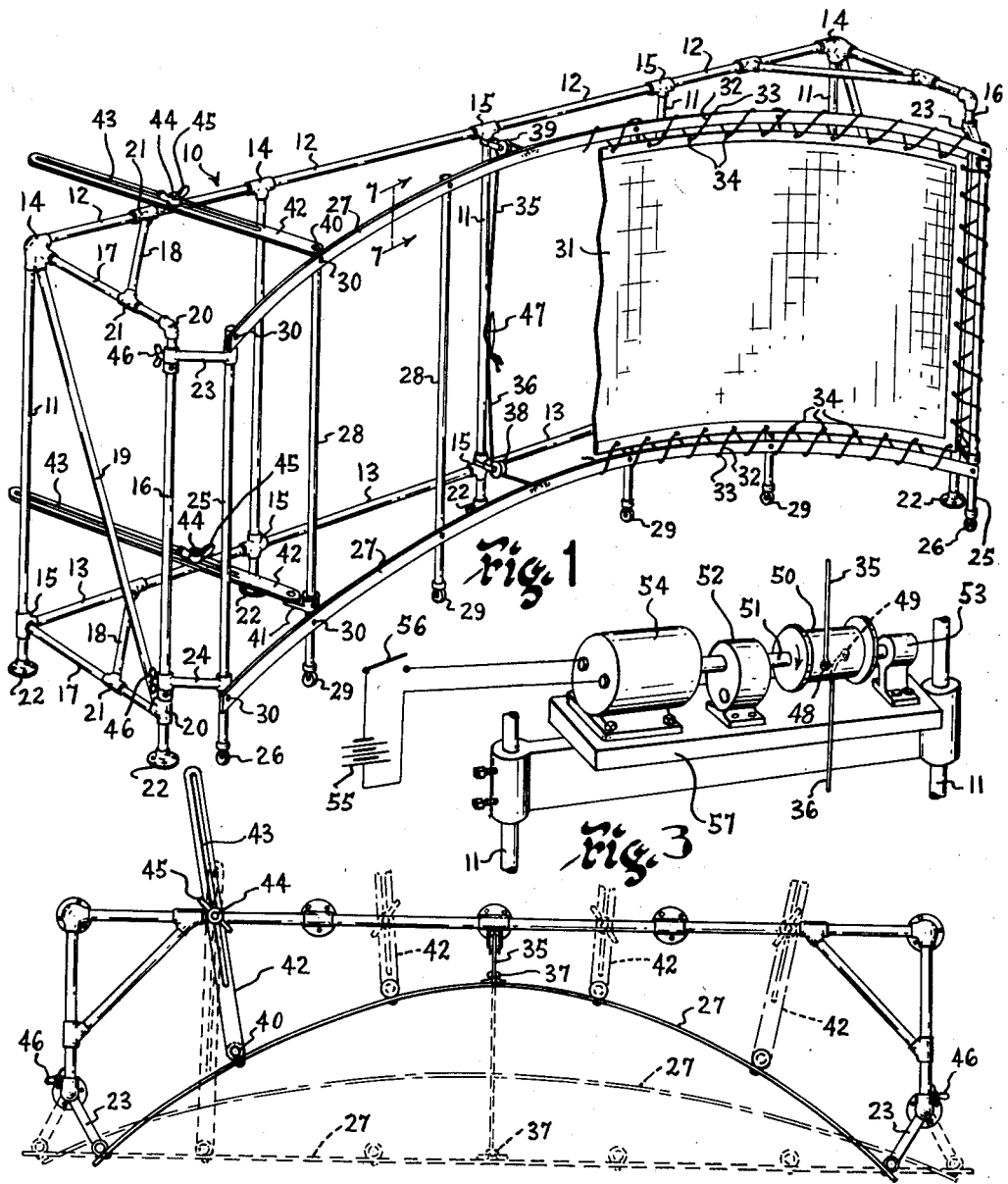
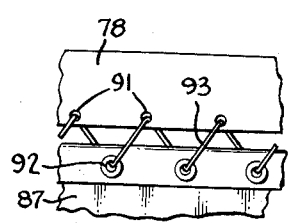
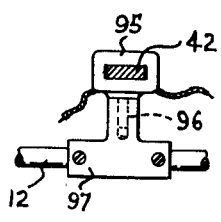
INVENTOR
EDWARD W. MOON 3rd
CHARLES P. TOSCANO
BY
ATTORNEY

United States Patent Office 2,942,517
Patented June 28, 1960

2,942,517

ADJUSTABLE SCREENS FOR PICTURE PROJECTION

Edward W. Moon 3rd, Pomfret, Conn., and Charles P. Toscano, Southbridge, Mass., assignors to American Optical Company, Southbridge, Mass., a voluntary association of Massachusetts Filed Aug. 17, 1956, Ser. No. 604,781

4 Claims. (Cl. 88—28.9)

This invention relates to screens for picture projection and has particular reference to the provision of screens of this nature which may be adjustable to different surface shapes.

One of the principal objects of the invention is to provide a screen for picture projection which may be adjusted from a relatively flat plane to different controlled shapes of curvatures.

Another object is to provide an adjustable screen of the above character and method of making the same which at different positions of adjustment will assume different desired shapes in accordance with present-day screen standards such, for example, as for conventional flat screen projection, commercially known Cinemascope projection and commercially known Todd-AO projection.

Another object is to provide an adjustable screen of the above character whose shape may be altered either manually or by remote control.

Another object is to provide means for retaining the screen to the configuration to which it has been adjusted.

Another object is to provide screens of the above character formed of flexible sheet material and supported throughout the upper and lower edges thereof by spaced bands of flexible material which, in accordance with proper control of cross-sectional dimension and length, and by suitably adjustably supporting them at their opposite ends, will, in response to given concentrated pulling forces exerted substantially centrally of said bands, automatically assume shapes of different desired curvatures.

Other objects and advantages of the invention will become apparent from the following description taken in connection with the accompanying drawings in which:

Fig. 1 is a diagrammatic perspective view of one embodiment of the invention showing a part of the viewing screen removed;

Fig. 2 is a top plan view of the device illustrated in Fig. 1;

Fig. 3 is a perspective view of remotely operable means for exerting a pulling force on the screen;

Fig. 4 is a fragmentary view partially in section of a further modification of the invention; and Fig. 5 is an enlarged fragmentary face view showing a means of attaching the screen to the supporting bands of the device illustrated in Fig. 1.

More recent developments in cinematography, particularly the type commercially known as Todd-AO which utilizes wide angle pictures, requires the use of a wide angle deeply curved viewing screen while other developments known commercially as Cinemascope require a screen having a more shallow curve than that required for Todd-AO and with conventional narrow angle pictures require the use of a flat screen. Due to the fact that such different shapes of screen are required, theatres having one particular type of screen were limited as to what type of picture film they could use. For example, a theatre having a narrow angle flat screen could not utilize Cinemascope or Todd-AO while, on the other hand, the curved screen of Cinemascope and the deeply curved screen of Todd-AO were not adaptable to the use of narrow angle flat picture projection.

It, therefore, is one of the primary objects of the present invention to overcome the above difficulty by providing an adjustable screen whose surface shape may be altered in accordance with the type of film being projected thereon thereby making it possible for a single theatre to project any of the known conventional commercial types of pictures.

In carrying out the invention, as shown throughout the several views of the drawings wherein like characters of reference designate like parts throughout the several views, the device as shown in Figs. 1 and 2, comprises a main frame 10 which embodies a plurality of spaced uprights 11 joined adjacent the upper and lower portions thereof by tie rods 12 and 13 through suitable couplings 14 and 15. The said frame 10 further comprises uprights 16 spaced forwardly of the uprights 11 and which are connected to said uprights by tie members 17, 18, and 19 which are respectively joined with the end couplings 14 and 15 and to other suitable couplings 20 and 21. The couplings are of the type having threaded openings therein and the tie rods and uprights are preferably formed of rigid pipe material threadedly connected to the respective couplings. The said uprights 11 and 16 are provided with flanged portions 22 by means of which they may be rigidly attached to flooring or the like. Pivotally attached to each of the end uprights 16 is a pair of arms 23 and 24 which, in turn, are pivotally attached to an upright 25 having a caster or the like 26 on the lower end thereof. Attached to said upright 25, adjacent the upper and lower ends thereof, is a pair of spaced bands 27 formed of flexible material such as steel or the like. Longitudinally of said bands 27, there is provided a plurality of spaced uprights 28 each having a caster or the like 29 on the lower ends thereof whereby the said uprights are free to roll on the flooring or the like. The bands are secured to the respective uprights 25 and 28 by bolts or the like 30. A screen 31 formed of flexible sheet material, such as vinyl or the like, is attached to said bands 27 by cords 32 having a plurality of loops 33 progressively wrapped around the respective bands and threaded through suitable spaced openings 34 formed adjacent the upper, lower and side edges of the screen 31. This holds the screen relatively taut and enables said screen to be altered in its shape while retained in said taut condition. The bands of yieldable material 27 are initially formed flat, as shown by the dash lines in Fig. 2, and because of the yieldable nature of said bands 27, they may be adjusted to differently curved shapes, such as shown by the dot and dash lines and full lines in Fig. 2. This curving of the bands is brought about by attaching suitable cords 35 and 36 to the rear of the central points of said bands by suitable couplings as shown diagrammatically at 37. The respective bands are extended over suitable pulleys 38 and 39 carried by the central upright 11 and by exerting a pulling action simultaneously on said respective cords and of a controlled amount, the bands 27 may be cupped inwardly controlled amounts, as diagrammatically shown in Fig. 2. It is to be borne in mind that the opposite ends of said bands move inwardly as permitted by the arms 23 and 24 which are pivotally connected with said bands and said uprights 16.

By controlling the cross-sectional dimension of the bands 27, as shown diagrammatically in Fig. 7, in accordance with the overall length of bands required, and by pivotally supporting the ends of the bands as set forth above, and further by exerting a pulling force of a controlled amount at the center of the bands, the said bands will inherently assume the curved shapes shown in Fig. 2. The shape illustrated by the dot and dash lines is of the shallow spherically curved type, preferably used in connection with Cinemascope projection, while the deeply curved shape illustrated by the solid lines departs somewhat from a spherical shape and inherently assumes more of a parabolum shape such as that required for Todd-AO projection.

The preferred material of said bands is steel but other metal or other materials having similar yielding or elastic characteristics may be used. The characteristics of the bands 27 are determined by the following formula:

$$\delta = \frac{Px}{12EI}\left(\frac{3l^2}{4} - x^2\right)$$

$$\text{for } 0 < x < \frac{l}{2}$$

wherein delta is the deflection at any point.

P is the concentrated load at the center.
$x$ is any position along the bar-like members.
$l$ is the total length of the member.
E is the modulus of elasticity of the material of the member.
I is the moment of inertia of the member.

The moment of inertia will determine how far you can bend the bands whereby the maximum curvature will not stress the bands beyond the elastic limit thereof.

It is particularly pointed out that with the above arrangement, the bands 27 and screen 31 will simultaneously automatically assume the shapes of curvatures recited and which result from the magnitude of the concentrated load or pull, the modulus of elasticity of the bands 27 and the moment of inertia of the section. It is to be understood that in no instance are the bands curved beyond the elastic limit of the material used in forming said bands, that is, the maximum curvature, as shown be the solid lines, is well within the elastic limit of said bands wherein, when the stress or pulling force at the center is released, the said bands will return to their initially flat shape, as shown by the dash lines in Fig. 2. The screen may then be utilized for conventional narrow angle flat picture projection.

Pivotally attached at 40 and 41, adjacent the upper and lower portions of the respective uprights 28, are a plurality of brace bars 42 each having a longitudinal slot 43 therein straddling bolts or the like 44 carried by the respective tie rods 12 and 13. The bolts 44 are respectively provided with a wing nut 45 which is initially loosened during the adjustment of the curvature of the screen and is thereafter tightened to lock and hold the screen to the curvature it has assumed by the flexing of the bands 27. One pair of said bars 42 is shown only by way of illustration.

It is further pointed out that the pivotal connections of the arms 23 and 24 with the upright 16 are provided with suitable wing nuts 46 whereby the said arms may be locked to the uprights after the screen has been adjusted. It is to be understood that other binding means may be used instead of the wing nuts, if desired. The central upright 11 is provided with a suitable attachment member 47 to which the respective cords 35 and 36 may be attached after the desired pulling stress has been imparted on the bands 27 so as to hold said bands in the desired cupped position.

Instead of utilizing manual attachment means 47, the said cords 35 and 36 may be attached, as shown diagrammatically in Fig. 3 at 48 and 49 to a spool 50 mounted on a shaft 51. The shaft 51 is connected at one end to suitable reduction gearing 52 and supported at its opposite end in a bearing 53. The reduction gearing is driven by a motor or other suitable source of power whereby the spool may be rotated and will cause the cords 35 and 36 to be simultaneously wound around said spool similar amounts and, in turn, impart a uniform pulling stress on said bands 27. The motor may be energized through any suitable source of power 55 and by closing a remotely located switch or the like 56. In this instance, the brace bars 42, instead of being provided with a longitudinal slot 43 and being mechanically locked in adjusted position may be extended through suitable electromagnets or similar means 95 so as to have free sliding movement therethrough when the said means 95 are de-energized and to be held against movement by said means when energized. The electromagnets or similar means 95 are pivotally connected at 96 with suitable attachment means 97 which are, in turn, connected with the tie rods 12 and 13.

The electromagnets or similar means are preferably all electrically connected with each other so as to be simultaneously energized or de-energized by a switch, not shown, and which may be located in the projection booth. The switch for energizing and de-energizing the motor 54 would also be located in the projection booth so that it may be operated by the motion-picture operator, if desired. In this manner, the shape of the screen may be varied during the actual showing of a picture or prior to the showing of a picture. After the screen has been properly adjusted, the electromagnets are then energized by closing the switch and thereby simultaneously function to hold all of the bars 42 and the screen to the shape to which it has been adjusted.

By reason of the fact that the electromagnets 95 are pivotally connected, as illustrated at 96, to the attachment means 97, they will be free to turn in a sidewise direction during the sliding movement of the brace bars 42 therethrough and will thereby offer no resistance to the self-adjusting characteristics of the bands 27.

The screens, of course, will be made in various sizes in accordance with the dimension of the proscenium arches of different theatres and in accordance with the general size of the theatre and projection distance. It is further to be understood that screens for home projection may be constructed in a similar manner.

It is further to be understood that each of said brace bars 42 which are pivotally connected with the respective uprights may be provided with electro-magnetic means such as shown and described in connection with Fig. 4 instead of being mechanically locked in adjusted position.

From the foregoing, it will be seen that simple, efficient and economical means and method have been provided for accomplishing all of the objects and advantages of the invention. It will be apparent, however, that many changes may be made in said means and method shown and described without departing from the spirit of the invention as expressed in the accompanying claims. Therefore, it is to be understood that all matter set forth in the specification or shown in the accompanying drawings is to be interpreted as illustrative and not in a limiting sense.

Having described our invention, we claim:

1. An adjustable screen of the character described comprising a main supporting frame having a pair of vertically spaced rigid horizontally disposed rods connected by vertically disposed rigid uprights at spaced intervals longitudinally thereof with one of said uprights being located adjacent one end of said rods and another adjacent the opposed end of said rods, said rods, adjacent the opposed ends thereof, having substantially normally related forwardly extending rigid tie members rigidly secured thereto, vertically disposed rigid uprights secured in fixed position adjacent the forward ends of said tie members, a pair of vertically spaced horizontally disposed yieldable bands, a plurality of spaced vertical uprights rigidly connected to said bands with one of said uprights being located adjacent one end of said bands and another adjacent the opposed end of said bands, arms pivotally connected adjacent one of their ends to the respective vertically disposed rigid uprights which are secured in fixed position adjacent the forward ends of said tie members and normally being disposed in a direction forwardly of said uprights and being pivoted adjacent their forward ends to the respective uprights located at each of the opposed ends of said bands, a plurality of brace bars pivotally connected adjacent the forward ends thereof to the vertically disposed uprights intermediate the uprights located adjacent the opposed ends of said bands and extending rearwardly transversely across said rigid horizontally disposed rods and normally being free to move relative to said rods, means connected centrally of said bands for imparting a pulling force thereon whereby the said bands may be cupped to varying degrees of curvature independently of and with respect to said main frame in response to the pivotal movement of said arms and to the free movement of said brace bars transversely of said horizontally disposed rods, binding means for securing said brace bars to said horizontally disposed rods after said bands are cupped to retain said bands in said adjusted position and a screen of flexible sheet material secured to said bands and to said uprights adjacent each of the opposed ends of said bands in spanning relation with said bands and said uprights and adapted to assume the shape to which said bands are curved.

2. An adjustable screen of the character described comprising a main supporting frame having a pair of vertically spaced rigid horizontally disposed rods connected by vertically disposed uprights at spaced intervals longitudinally thereof with one of said uprights being located adjacent one end of said rods and another adjacent the opposed end of said rods, said rods, adjacent said opposed ends, having substantially normally related forwardly extending rigid tie members rigidly secured thereto, vertically disposed rigid uprights secured in fixed position adjacent the forward ends of said tie members, angled rigid tie members connecting the intermediate parts of said normally related tie members with the horizontally disposed rods at locations spaced inwardly of the ends of said rods, a pair of vertically spaced horizontally disposed yieldable bands, a plurality of spaced vertical uprights connected to said bands with one of said uprights being located adjacent one end of said bands and another adjacent the opposed end of said bands, arms pivotally connected adjacent one of their ends to the respective vertically disposed rigid uprights which are secured in fixed position adjacent the forward ends of said tie members and normally being disposed in a direction forwardly of said uprights and being pivoted adjacent their forward ends to the respective uprights located at each of the opposed ends of said bands, a plurality of longitudinally slotted brace bars pivotally connected adjacent each of their forward ends to a respective vertically disposed upright intermediate the uprights located adjacent the opposed ends of said bands and extending rearwardly transversely of said rigid horizontally disposed rods and normally being free to move transversely rearwardly and forwardly with respect to said rods, means connected centrally of said bands for imparting a pulling force thereon whereby the said bands may be cupped to varying degrees of curvature with respect to said main supporting frame in response to the pivotal movement of said arms and to the free movement of said brace bars transversely of said horizontally disposed rods, binding bolts carried by said rods extending through said slots in said brace bars and which may be tightened to retain said yieldable bands in adjusted position and a screen of flexible sheet material secured to said bands and to said uprights adjacent each of the opposed ends of said bands in spanning relation with said bands and said uprights and adapted to assume the shape to which said bands are curved.

3. An adjustable screen of the character described comprising a main supporting frame having a pair of vertically spaced rigid horizontally disposed rods connected by vertically disposed rigid uprights at spaced intervals longitudinally thereof with one of said uprights being located adjacent one end of said rods and another adjacent the opposed end of said rods, said rods, adjacent the opposed ends thereof, having substantially normally related forwardly extending rigid tie members rigidly secured thereto, vertically disposed rigid uprights secured in fixed position adjacent the forward ends of said tie members, a pair of vertically spaced horizontally disposed yieldable bands, a plurality of spaced vertical uprights rigidly connected to said bands with one of said uprights being located adjacent one end of said bands and another adjacent the opposed end of said bands, arms pivotally connected adjacent one of their ends to the respective vertically disposed rigid uprights which are secured in fixed position adjacent the forward ends of said tie members and normally being disposed in a direction forwardly of said uprights and being pivoted adjacent their forward ends to the respective uprights located at each of the opposed ends of said bands, a plurality of brace bars pivotally connected adjacent the forward ends thereof to the vertically disposed uprights intermediate the uprights located adjacent the opposed ends of said bands and extending rearwardly transversely across said rigid horizontally disposed rods and normally being free to move relative to said rods, pull cord means connected centrally of said bands for imparting a pulling force thereon whereby the said bands may be cupped to varying degrees of curvature independently of and with respect to said main frame in response to the pivotal movement of said arms and to the free movement of said brace bars transversely of said horizontally disposed rods, means carried by the main frame to which said pull cord means may be attached to retain said pulling force, binding means for securing said brace bars to said horizontally disposed rods after said bands are cupped to retain said bands in said adjusted position and a screen of flexible sheet material secured to said bands and to said uprights adjacent each of the opposed ends of said bands in spanning relation with said bands and said uprights and adapted to assume the shape to which said bands are curved.

4. An adjustable screen of the character described comprising a main supporting frame having a pair of vertically spaced rigid horizontally disposed rods connected by vertically disposed rigid uprights at spaced intervals longitudinally thereof with one of said uprights being located adjacent one end of said rods and another adjacent the opposed end of said rods, said rods, adjacent the opposed ends thereof, having substantially normally related forwardly extending rigid tie members rigidly secured thereto, vertically disposed rigid uprights secured in fixed position adjacent the forward ends of said tie members, a pair of vertically spaced horizontally disposed yieldable bands, a plurality of spaced vertical uprights rigidly connected to said bands with one of said uprights being located adjacent one end of said bands and another adjacent the opposed end of said bands, arms pivotally connected adjacent one of their ends to the respective vertically disposed rigid uprights which are secured in fixed position adjacent the forward ends of said tie members and normally being disposed in a direction forwardly of said uprights and being pivoted adjacent their forward ends to the respective uprights located at each of the opposed ends of said bands, a plurality of brace bars pivotally connected adjacent the forward ends thereof to the vertically disposed uprights intermediate the uprights located adjacent the opposed ends of said bands and extending rearwardly transversely across said rigid horizontally disposed rods and normally being free to move relative to said rods, pull cord means connected centrally of said bands for imparting a pulling force thereon whereby said bands may be cupped to varying degrees of curvature independently of and with respect to said main frame in response to the pivotal movement of said arms and to the free movement of said brace bars transversely of said horizontally disposed rods, means electrically operable to which said pull cord means is attached for imparting said pulling force thereon, binding means of the type exerting a magnetic force for securing said brace bars to said horizontally disposed rods after said bands are cupped to retain said bands in said adjusted position, means operable from a remote location for energizing and deenergizing said electrically operable means and energizing or deenergizing said binding means of the type for exerting a magnetic force whereby said bands may be cupped to varying degrees and held in said cupped position by means of said remotely located means and a screen of flexible sheet material secured to said bands and to said uprights adjacent each of the opposed ends of said bands in spanning relation with said bands and said uprights and adapted to assume the shape to which said bands are curved.

References Cited in the file of this patent

UNITED STATES PATENTS

| | | |
|---|---|---|
| 1,089,448 | Tillotson | Mar. 10, 1914 |
| 1,212,424 | Tillotson | Jan. 16, 1917 |
| 1,457,209 | Chanier | May 29, 1923 |
| 1,904,963 | Vallen | Apr. 18, 1933 |
| 2,081,299 | Hill | May 25, 1937 |
| 2,473,301 | Ramstead | June 14, 1949 |
| 2,664,785 | Roehrig | Jan. 5, 1954 |